(12) United States Patent
Jacquet-Francillon et al.

(10) Patent No.: US 7,921,632 B2
(45) Date of Patent: Apr. 12, 2011

(54) DEVICE FOR PROTECTION AGAINST ICING FOR AIRCRAFT ENGINES AND RELATED DE-ICING METHOD

(75) Inventors: Pierre Jacquet-Francillon, Grenade sur Garonne (FR); Gilles Chene, Toulouse (FR)

(73) Assignee: Airbus France, Toulouse Cedex (FR)

( * ) Notice: Subject to any disclaimer, the term of this patent is extended or adjusted under 35 U.S.C. 154(b) by 356 days.

(21) Appl. No.: 11/574,023

(22) PCT Filed: Sep. 12, 2005

(86) PCT No.: PCT/FR2005/050733
§ 371 (c)(1),
(2), (4) Date: May 26, 2009

(87) PCT Pub. No.: WO2006/032808
PCT Pub. Date: Mar. 30, 2006

(65) Prior Publication Data
US 2009/0294593 A1 Dec. 3, 2009

(30) Foreign Application Priority Data
Sep. 21, 2004 (FR) ...................................... 04 52110

(51) Int. Cl.
*B64D 15/22* (2006.01)
(52) U.S. Cl. .................................. 60/39.093; 244/134 F
(58) Field of Classification Search .............. 244/134 R, 244/134 B, 134 D, 134 F; 60/39.093; 73/661; 340/580, 582, 962
See application file for complete search history.

(56) References Cited

U.S. PATENT DOCUMENTS

| | | | | |
|---|---|---|---|---|
| 2,645,080 A | * | 7/1953 | Newcomb | 60/39.093 |
| 3,341,835 A | * | 9/1967 | Werner et al. | 340/582 |
| 3,517,900 A | * | 6/1970 | Roussel | 340/580 |
| 3,541,540 A | | 11/1970 | Hughes | |
| 3,981,466 A | * | 9/1976 | Shah | 244/134 R |
| 4,467,599 A | * | 8/1984 | Moore | 60/226.1 |
| 4,550,564 A | * | 11/1985 | Callahan et al. | 60/39.093 |
| 4,646,068 A | * | 2/1987 | Skala | 340/580 |
| 4,782,331 A | | 11/1988 | Martens | |
| 4,783,026 A | * | 11/1988 | Rumford et al. | 244/134 R |
| 5,423,174 A | * | 6/1995 | Mouton | 60/39.093 |
| 5,523,959 A | * | 6/1996 | Seegmiller | 244/134 R |
| 6,304,194 B1 | | 10/2001 | McKillip | |
| 6,560,551 B1 | | 5/2003 | Severson et al. | |
| 7,000,871 B2 | * | 2/2006 | Barre et al. | 244/134 F |

FOREIGN PATENT DOCUMENTS

DE  33 33 437 A1  4/1985
EP  1 495 963 A2  1/2005

* cited by examiner

*Primary Examiner* — Galen Barefoot
(74) *Attorney, Agent, or Firm* — Perman & Green, LLP

(57) ABSTRACT

A device for protection against icing for aircraft engines including at least one sensor, sensitive to an amount of accumulated ice, arranged in the air intake of an aircraft engine, a system for measuring the amount and comparing the amount to be predetermined threshold and a triggering system for launching a response to the detection of the crossing of the predetermined threshold, the response may be an alarm, an increase in the engine power delayed by the engine control system or the return of hot air upstream of the engine.

13 Claims, 2 Drawing Sheets

DEVICE FOR PROTECTION AGAINST ICING FOR AIRCRAFT ENGINES AND RELATED DE-ICING METHOD

CROSS REFERENCE TO RELATED APPLICATIONS

This application is the National Stage of International Application No. PCT/FR2005/050733 International Filing Date, 12 Sep. 2005, which designated the United States of America, and which International Application was published under PCT Article 21 (2) as WO Publication No. WO2006/032808 and which claims priority from French Application No. 0452110, filed on 21 Sep. 2004, the disclosures of which are incorporated herein by reference in their entireties.

BACKGROUND

1. Field

The disclosed embodiments relate to a device and a method for protecting against ice accretion for aircraft engines.

2. Brief Description of Related Developments

Due to operating constraints and in particular due to the waiting times before take-off, aircraft, particularly civil aircraft, are subject to exposure time in considerable icing conditions with their engines idling.

Although the engines are running, these conditions entail the risk of accumulating large amounts of ice on the static (or not) upstream parts of the engines and in particular on the blades of the low-pressure compressor, commonly known as an air blower, or fan, which rotates at a low speed when the engine is idling, or on the fixed downstream parts of the air blower or the inner wall of the front part of the engine nacelle, in particular in the area surrounding the air blower, or fan.

In order to reduce ice accretion in the engines, ground methods exist for ensuring regular de-icing of the engines.

These methods involve periodically increasing the speed of the engine so as to centrifuge the ice accumulated on the rotating parts and increase the temperature of the engine airflow downstream from the air blower, in order to remove any ice which may have accumulated on the fixed parts of the engine.

These methods require the flight crew to monitor the time spent in icing conditions during the taxiing stage after landing as well as during taxiing prior to takeoff and the outside temperature.

Furthermore, the methods systematically implemented when the supposed icing conditions are reached do not take into account the real amount of ice accumulated and lead to increased fuel consumption and unnecessary pollution of airports.

Ice detection systems exist for detecting icing conditions during the flight. These systems are based on a probe equipped with an ice-sensitive element, which transmits information when the aircraft passes through an icing cloud.

These devices, which have the main aim of warning the crew but can also be used to automatically engage the icing protection systems of the plane, comprise a probe requiring an airflow to provide reliable information.

Such a probe can furthermore be installed in the air intake of the engine and be subjected to the airflow sucked in by the engine, which also enables it to provide information when the plane is performing ground operations.

In this case, the probe is also used to activate an alarm indicating the presence of ice but it does not make it possible to determine the actual amount of ice accumulated.

SUMMARY

The aspect of the disclosed embodiments is to provide a device for protecting against ice accretion in parts of aircraft engines comprising, firstly, means for detecting the amount or thickness of the accumulated ice so as only to apply the de-icing processes in response to real, demonstrated ice accretion.

In order to do so, the disclosed embodiments relate, firstly, to a device for protecting against ice accretion in aircraft engines characterised in that it comprises a sensor sensitive to an amount of accumulated ice arranged in the air intake of an aircraft engine, a system for measuring said amount and for comparing said amount to a predetermined threshold, and a trigger system intended to initiate a response to a detection of the predetermined threshold being surpassed.

The response can comprise, in particular, triggering an alarm and/or displaying an instruction to increase the engine speed on the control panel.

The disclosed embodiments aim to provide a device for protecting against ice accretion in aircraft engines, relieving the pilots of the task of monitoring the icing conditions of the engine. According to this embodiment, the device is connected to an engine control system comprising means for governing engine speed, the response comprising an engine speed increase.

Preferably, the trigger system and/or the engine control system are connected to means for measuring the temperature and comprise means for managing the duration of the engine speed increase according to the temperature and the amount of ice measured.

The disclosed embodiments also include performing an aircraft engine de-icing process mainly comprising a step of measuring the amount of ice on at least one wall of an element of the engine, a step of comparing the measured amount of ice to a predetermined threshold amount and a step of triggering a response to the predetermined threshold being surpassed.

The method advantageously also comprises a step of increasing the engine speed and/or a step of transmitting hot air to the upstream part of the engine in response to a predetermined threshold being surpassed.

According to a preferred embodiment, the method comprises a step of the engine control system delaying the engine speed increase according to stored parameters that represent the duration of the icing conditions and of adapting the delay in relation to said parameters.

Other features and advantages of the disclosed embodiments will be understood better from reading the following description of a non-limiting embodiment made in reference to the appended drawings, wherein:

DETAILED DESCRIPTION OF THE DISCLOSED EMBODIMENTS

Figure 1:
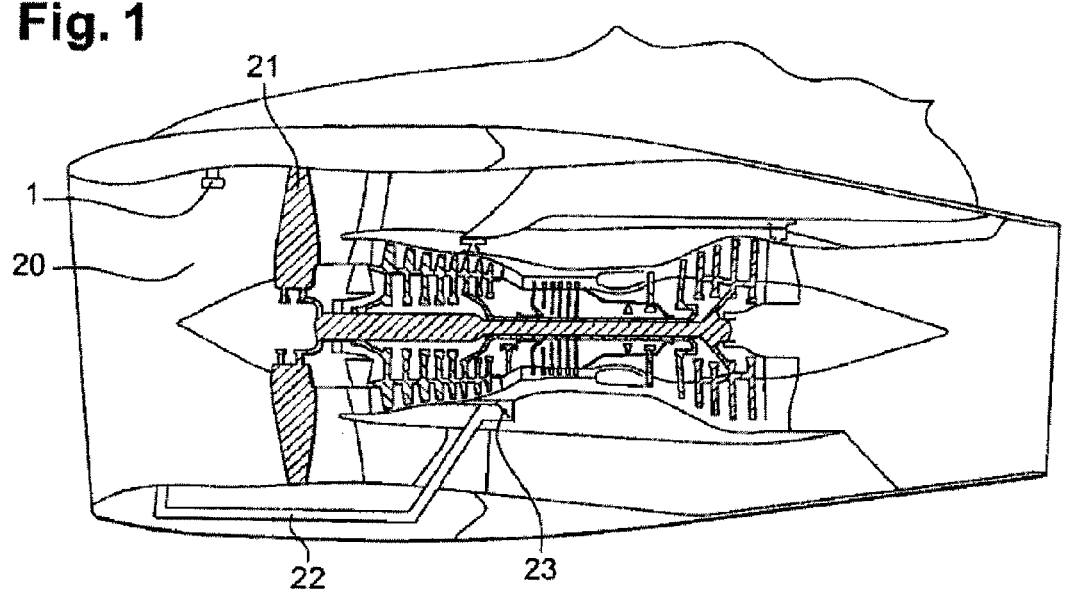
FIG. 1 shows a schematic cross-section view of an aircraft engine equipped with a sensor according to the disclosed embodiments.

As previously seen, the device for protecting against ice accretion according to the disclosed embodiments is based on detecting an amount of accumulated ice on an air intake element 20 of an aircraft engine as shown in FIG. 1. In order to do so, the device comprises at least one sensor 1, sensitive to an amount of accumulated ice, arranged in the air intake of the engine 2 in a location that is representative of ice accretion in the engine.

The location that is representative of ice accretion is determined by tests and measurements under icing conditions, this location can be in front of the air blower, or fan, 21 as shown in FIG. 1 or behind this air blower, depending on the configuration of the engine in question.

Figure 2:
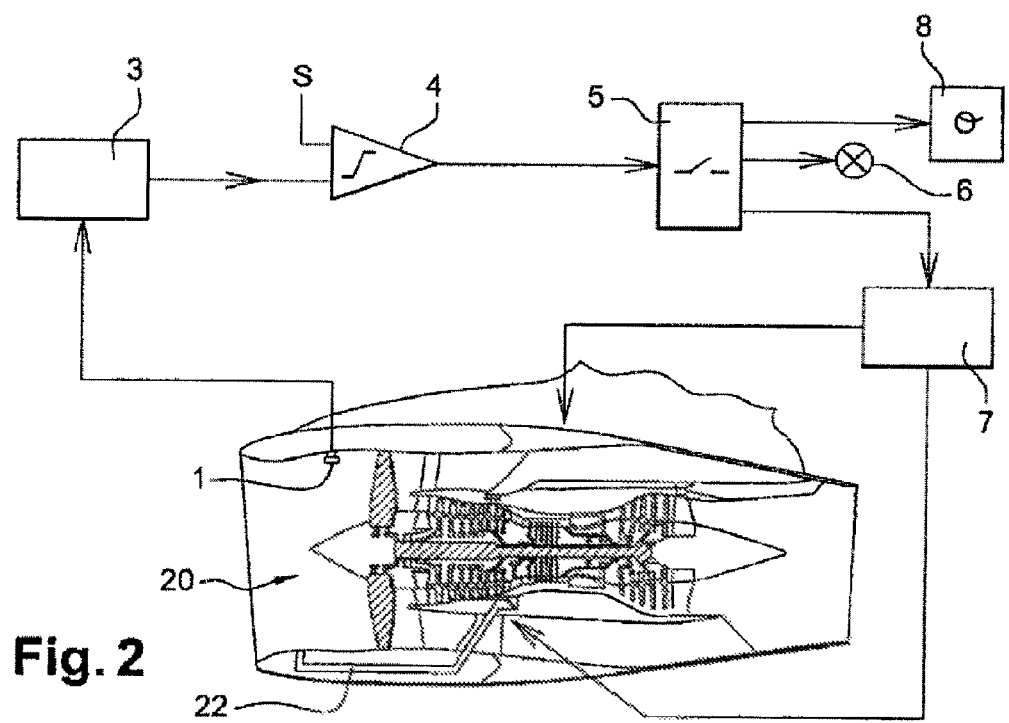
FIG. 2 shows a schematic view of an example of an embodiment of a device.

The device, more accurately shown in a diagram in FIG. 2, comprises a system for measuring 3 the amount of ice detected by the sensor 1. The measurement system can be integrated with the sensor casing or arranged near an engine control system 7 such as an engine operation management computer.

The device also comprises a system 4 for comparing said amount to a predetermined threshold S and a trigger system 5. The comparison system can be integrated with the measurement system 3 or with the trigger system 5, the latter being intended for initiating a response to a detection of the predetermined threshold being surpassed.

The predetermined threshold is a piece of data included in an aircraft computer. This piece of data can be calculated from external data such as the overall taxiing or engine idling time and the external conditions, particularly the external temperature, but this piece of data can also be a set piece of data corresponding to the top limit value for the amount of ice which is acceptable for the engine.

"Response" is understood to mean the triggering of a process intended for de-icing the engine and, according to the disclosed embodiments, the response is carried out when an amount of ice is detected.

The most commonly used method of de-icing the engine is to increase the engine speed.

According to one embodiment, the trigger system 5 is connected to an alarm device 6 on the control panel of the aircraft, the response comprising triggering the alarm device 6 and/or displaying an instruction to increase engine speed on the control panel, the pilots being responsible for increasing the engine speed in order to de-ice the latter.

In this case, the device can simply comprise means for detecting the engine acceleration applied by the pilots, and can be configured to maintain the alarm for a duration that is compatible with correct de-icing of the engine in relation to this acceleration.

This embodiment already has the advantage compared with former methods of not requiring the pilots to monitor the icing conditions and the time the engine has spent idling, and to initiate systematic periodic engine acceleration phases, making it possible to perform these de-icing phases only when useful.

According to a preferred embodiment, specifically that shown in FIG. 2, the trigger system 5 is also connected to an engine control system 7 comprising means for governing the engine speed, said response comprising an automatic engine speed increase delayed by the engine control system 7.

Preferably, the alarm device is retained because, since the engine speed increase required for de-icing is up to 70% of the speed N1 of the air blower 21, it is desirable for the pilots to be warned when the device is activated.

According to this embodiment, engine speed is increased automatically to initiate the de-icing phases, the alarm in this case being a warning given to the pilots that a de-icing phase is beginning or is going to begin so that they can, for example, apply the brakes.

According to a first embodiment, the trigger system 5 and/or the engine control system 7 are connected to means 8 for measuring the temperature of the engine air intake and comprise means for managing the duration of the engine speed increase in relation to the temperature and the amount of ice measured.

Indeed, according to the disclosed embodiments, the de-icing method is optimised, this optimisation involving limiting the engine acceleration phases over a duration which is actually necessary and sufficient for this de-icing, this duration depending not only on the amount of ice accumulated at the monitored part but also on the external conditions, which can be severe enough for other areas to be at risk of being heavily loaded with ice.

In an alternative or complementary embodiment, the device is connected to a system 22 for expelling and returning hot air onto the upstream part of the engine. Thus, the device can first open a valve 23 for expelling hot air, expel the hot air onto a hot part of the motor, typically a low- or medium-pressure compressor stage onto which hot air can be expelled without affecting the correct operation of the engine while optimising the de-icing of critical parts of the engine subject to ice accumulation by sending the hot air onto them or upstream from them.

The use of such a hot air expulsion system controlled by the device according to the disclosed embodiments enables, in an engine equipped with same, a reduction or even elimination of the engine acceleration phases, thereby reducing engine fuel consumption and noise pollution.

The device according to the disclosed embodiments can additionally comprise storage means and computation means configured to accumulate the durations corresponding to the icing conditions and adapt the delay of the engine speed increase to said accumulation. These means can be included in one of said measurement systems 3 and engine control systems 7.

The sensor 1 can consist of a surface probe built onto the surface of an engine subjected to icing and measuring an area of ice, but preferably consists of a vibrating finger probe subjected to the airflow entering the engine. Several sensors can be arranged at different parts of the air intake.

The vibrating finger probe is a probe with a magnetostrictive sensor comprising a cylindrical rod which vibrates under the action of an electronic oscillating circuit with a frequency of around 40 Hz, and a circuit for detecting the vibration frequency of the probe. The vibration frequency of the rod decreases in relation to the accretion of ice on the sensor, which provides a measurement of the amount of ice in the monitored area and triggers the de-icing device after a chosen icing threshold, be it a fixed predefined value or a value defined dynamically according to the operating conditions of the aircraft.

Thus, the working principle of the de-icing device makes it possible to implement an aircraft engine de-icing method according to the disclosed embodiments.

Figure 3:
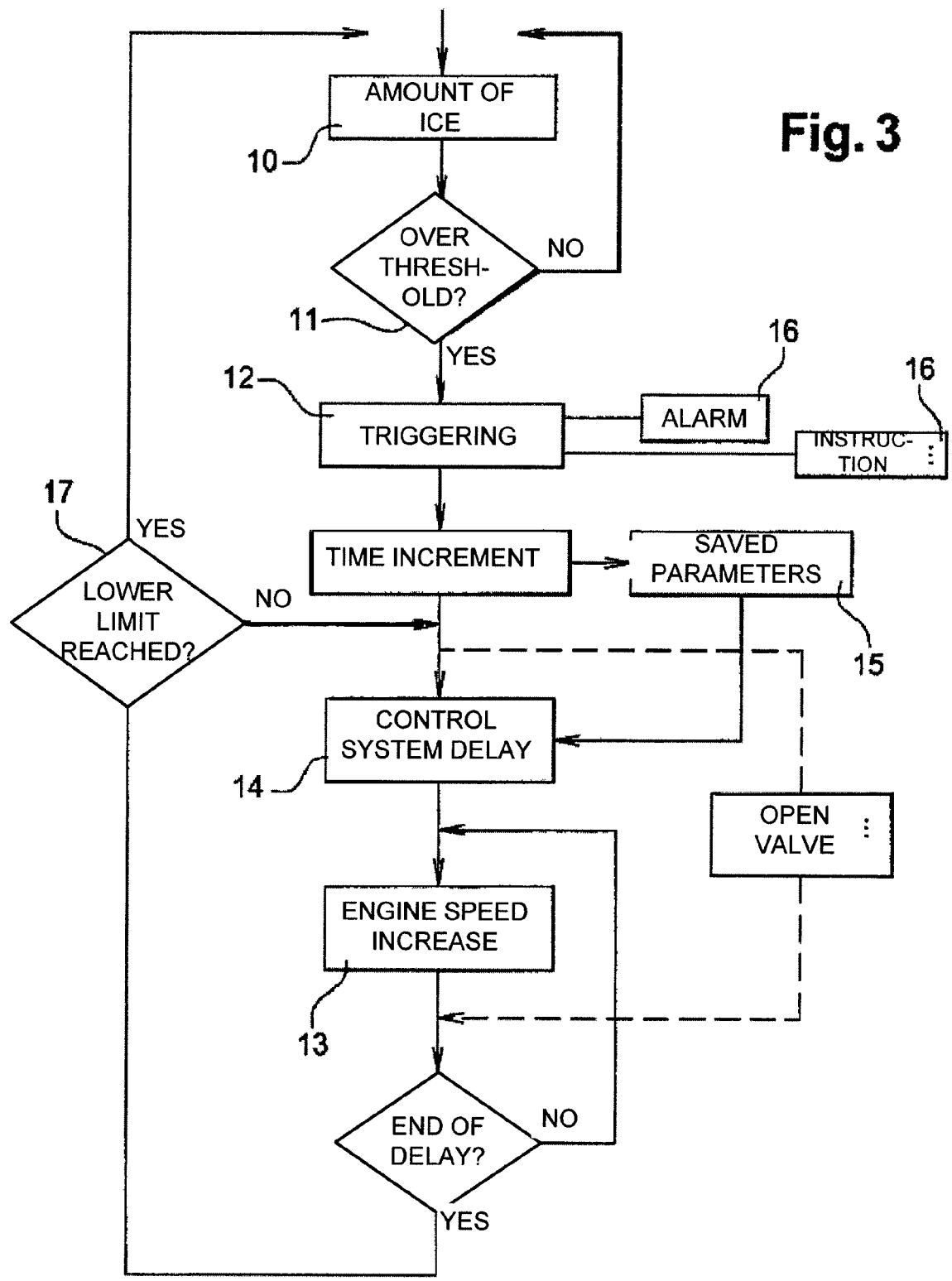
FIG. 3 shows a schematic representation of the de-icing method according to the disclosed embodiments.

This method, shown schematically in a simplified manner in FIG. 3, comprises a step 10 of measuring the amount of ice on at least one wall of an engine element, a step 11 of comparing the amount of ice measured to a predetermined threshold amount and a step 12 of triggering a response to the predetermined threshold being surpassed. The response can consist, as seen previously, of triggering an alarm 16, but according to a preferred embodiment, the response is a step 13 of increasing the engine speed in response to a predetermined threshold being surpassed. The duration of this step, according to the example, depends on saved conditions, the method comprising a step 14 of the engine control system delaying the engine speed increase according to the saved parameters that are representative of the duration of the icing conditions and the adaptation of the delay according to said parameters.

When the delay ends or once the amount of ice measured falls below a lower limit (step 17), the engine speed is reduced to idle and the system returns to standby mode.

The disclosed embodiments are not limited by the description above and, in particular in alternate embodiment, the engine control system can comprise means for detecting external events that enable engine speed increase instructions to be cancelled when external events such as the pilots performing certain actions on the controls or manually increasing the engine speed are detected.

The invention claimed is:

1. A device for protecting against ice accretion in aircraft engines at idling speed comprising at least one sensor, sensitive to an amount of accumulated ice, arranged in the air intake of an aircraft engine, a system for measuring said amount and for comparing said amount to a predetermined threshold and a trigger system intended to initiate a response to a detection of the predetermined threshold being surpassed, wherein the trigger system is connected to an engine control system comprising means for governing engine idling speed, said response comprising an engine speed increase timed by the engine control system.

2. A device according to claim 1, wherein the trigger system is connected to an alarm device and/or to a device for displaying an instruction to increase engine speed on the control panel of the aircraft, said response comprising triggering an alarm device and/or displaying the instruction.

3. A device according to claim 1, wherein the trigger system and/or the engine control system are connected to means for measuring the temperature of the air intake of the engine and comprise means for managing the duration of the engine speed increase according to the temperature and the amount of ice measured.

4. A device according to claim 3, wherein at least one of said measurement system and engine control system comprises storage means and computation means configured to accumulate the durations corresponding to the icing conditions and adapt the timing of the engine speed increase to said accumulation.

5. A device according to claim 1, wherein said sensor comprises a surface probe built onto the surface of the engine subjected to icing and measuring an area of ice.

6. A device according to claim 1, wherein said sensor comprises a vibrating finger probe subjected to the air flow entering the engine.

7. A device according to claim 1, wherein the trigger system is connected to a system for expelling and returning hot air onto the upstream part of the engine.

8. A device according to claim 1 wherein said response comprises an engine speed increase up to 70% of a speed of an air blower of the aircraft engine.

9. A de-icing method for an aircraft engine at idling speed, comprising:
measuring an amount of ice on at least one wall of an engine element,
comparing the amount of ice measured to a predetermined threshold amount
triggering a response to the predetermined threshold being surpassed, and increasing the engine speed in response to the predetermined threshold being surpassed to perform a de-icing phase.

10. A method according to claim 9, wherein increasing the engine speed comprises increasing the engine speed of up to 70% of a speed of an air blower of the aircraft engine.

11. A method according to claim 9, comprising using the engine control system for delaying the engine speed increase according to the saved parameters that are representative of the duration of the icing conditions and increasing the engine speed according to said parameters.

12. A method according to claim 9, comprising returning hot air to the upstream part of the engine in response to the predetermined threshold being surpassed.

13. A method according to claim 9, comprising warning pilots of the aircraft with an alarm device that a de-icing phase is beginning or is going to begin.

* * * * *